(12) United States Patent
Cinotti et al.

(10) Patent No.: US 11,267,700 B2
(45) Date of Patent: Mar. 8, 2022

(54) CATALYST FOR CATALYTIC OXIDATIVE CRACKING OF HYDROGEN SULPHIDE WITH CONCURRENT HYDROGEN PRODUCTION

(71) Applicant: NEXTCHEM S.P.A., Rome (IT)

(72) Inventors: Pierlorenzo Cinotti, Rome (IT); Michele Colozzi, Rome (IT); Simona Cortese, Rome (IT); Marino Miccio, Rome (IT); Emma Palo, Rome (IT); Lucia Barbato, Rome (IT); Vincenzo Palma, Salerno (IT); Daniela Barba, Salerno (IT)

(73) Assignee: NEXTCHEM S.P.A., Rome (IT)

( * ) Notice: Subject to any disclaimer, the term of this patent is extended or adjusted under 35 U.S.C. 154(b) by 0 days.

(21) Appl. No.: 16/630,423

(22) PCT Filed: Jun. 17, 2019

(86) PCT No.: PCT/NL2019/050370
§ 371 (c)(1),
(2) Date: Jan. 10, 2020

(87) PCT Pub. No.: WO2019/240586
PCT Pub. Date: Dec. 19, 2019

(65) Prior Publication Data
US 2021/0094822 A1    Apr. 1, 2021

(30) Foreign Application Priority Data
Jun. 15, 2018   (EP) .................................... 18178069

(51) Int. Cl.
*C01B 3/02* (2006.01)
*B01D 5/00* (2006.01)
(Continued)

(52) U.S. Cl.
CPC ................. *C01B 3/02* (2013.01); *B01D 5/00* (2013.01); *B01D 53/8612* (2013.01);
(Continued)

(58) Field of Classification Search
CPC ... C01B 3/02; C01B 17/0465; C01B 17/0495; C01B 17/0426; C01B 3/04;
(Continued)

(56) References Cited

U.S. PATENT DOCUMENTS

| 4,481,181 A | 11/1984 | Norman |
| 6,800,269 B2 | 10/2004 | Keller |

(Continued)

FOREIGN PATENT DOCUMENTS

| EP | 2 944 367 | 11/2015 |
| IT | 1203898 B | 2/1989 |

(Continued)

OTHER PUBLICATIONS

Koyuncu et al. "Selectivity and Stability Enhancement of Iron Oxide Catalyst by Ceria Incorporation for Selective Oxidation of H2S to Sulfur" Ind. Eng. Chem. Res. 2009, 48, 5223-5229 (Year: 2009).*

(Continued)

*Primary Examiner* — Anthony J Zimmer
*Assistant Examiner* — Syed T Iqbal
(74) *Attorney, Agent, or Firm* — Leason Ellis LLP (57) ABSTRACT

Disclosed is a catalyst suitable for the catalytic oxidative cracking of a $H_2S$-containing gas stream. The catalyst comprises at least one or more active metals selected from the group consisting of iron, cobalt, and nickel, supported by a carrier comprising ceria and alumina. The active metal is preferably in the form of its sulphide. Also disclosed is a method for the production of hydrogen from a $H_2S$-containing gas stream, comprising subjecting the gas stream to (Continued)

catalytic oxidative cracking so as to form $H_2$ and $S_2$, using a catalyst in accordance with any one of the composition claims.

18 Claims, 1 Drawing Sheet

(51) Int. Cl.
| | |
|---|---|
| B01D 53/86 | (2006.01) |
| B01J 23/755 | (2006.01) |
| B01J 37/02 | (2006.01) |
| B01J 37/08 | (2006.01) |
| C01B 17/04 | (2006.01) |

(52) U.S. Cl.
CPC ......... B01J 23/755 (2013.01); B01J 37/0207 (2013.01); B01J 37/082 (2013.01); C01B 17/0465 (2013.01); B01D 2251/102 (2013.01); B01D 2251/51 (2013.01); B01D 2255/20753 (2013.01); B01D 2256/16 (2013.01); B01D 2257/304 (2013.01); B01D 2259/122 (2013.01)

(58) Field of Classification Search
CPC .............. C01B 17/0404; C01B 17/0408; B01J 37/082; B01J 37/0207; B01J 23/755; B01J 8/00; B01D 53/8612; B01D 2251/102; B01D 5/00; B01D 2255/20753; B01D 2251/51; B01D 2259/122; B01D 2257/304; B01D 2256/16; Y02E 60/36; Y02P 20/129
See application file for complete search history.

(56) References Cited

U.S. PATENT DOCUMENTS

| | | |
|---|---|---|
| 6,946,111 B2 | 9/2005 | Keller |
| 7,560,088 B2 | 7/2009 | Keller et al. |
| 2014/0134096 A1* | 5/2014 | Angelini .............. C01B 17/0404 423/576.8 |
| 2017/0266636 A1 | 9/2017 | Fukasawa et al. |

FOREIGN PATENT DOCUMENTS

| | | |
|---|---|---|
| WO | 2010141496 A1 | 9/2010 |
| WO | 2012154041 A1 | 11/2012 |
| WO | 2014073966 A1 | 5/2014 |

OTHER PUBLICATIONS

International Search Report and Written Opinion for PCT/NL2019/050370, dated Nov. 15, 2019, 10 pages.

Jiratova et al., "Hydrodesulfurization activities of NiMo catalysts supported on mechanochemically prepared Al—Ce mixed oxides," Chinese Journal of Catalysis (2016) 37:258-267.

Jiratova et al., "Hydrodesulfurization activities of NiMo catalysts supported on mechanochemically prepared Al—Ce mixed oxides", Chinese Journal of Catalysis, vol. 37, pp. 258-267. Cited in the Specification on p. 7 line 6. 10 Pages.

Clark, "Production of H2 from catalytic partial oxidation of H2S in a short-contact-time reactor", Catalysis Communications, 2004, vol. 5, pp. 743-747. Cited in the Specification on p. 4 line 8. 5 Pages.

Xiaoding Xu et al., "Transformation of a structured carrier into structured catalyst", Structured Catalysts And Reactors, Marcel Dekker Inc., 1998, pp. 599-615. Cited in the Specification on p. 11 line 27. 9 Pages.

* cited by examiner

CATALYST FOR CATALYTIC OXIDATIVE CRACKING OF HYDROGEN SULPHIDE WITH CONCURRENT HYDROGEN PRODUCTION

CROSS-REFERENCE TO RELATED APPLICATIONS

This application is the national phase of PCT application PCT/NL2019/050370 having an international filing date of 17 Jun. 2019, which claims benefit of European patent application No. 18178069.3 filed 15 Jun. 2018. The contents of the above patent applications are incorporated by reference herein in their entirety.

FIELD OF THE INVENTION

The invention pertains to a catalyst suitable for a catalytic oxidative process for recovering sulphur from a $H_2S$-containing gas stream. The invention also pertains to a method for recovering sulphur from such gas stream, using the catalyst. Furthermore, the invention pertains to the production of hydrogen associated with a sulphur recovery process using the catalyst.

BACKGROUND OF THE INVENTION

Sulphur Recovery Plants are designed to remove $H_2S$ from $H_2S$-containing acid gases from Amine Regeneration Systems and from Sour Water Strippers producing sulphur, a non-toxic product which can be stored and sold in liquid or in solid form to different users for several different industrial applications. The acid gases from Amine Regeneration Systems and Sour Water Strippers, containing a variable amount of $H_2S$, are treated in a Sulphur Recovery Unit (SRU), generally based on the modified Claus process, for bulk sulphur recovery and subsequently in a Tail Gas Treatment (TGT) section for deep sulphur recovery. Other impurities contained in the sour gases, including ammonia and hydrocarbons, are destroyed in the Claus section.

The modified Claus process by itself recovers about 94÷96% (2 catalytic stages) or 95÷98% (3 stages) of the sulphur in the feedstock. A further treatment of the Claus tail gas is therefore necessary when a higher Sulphur Recovery Efficiency (SRE) is required.

The modified Claus process comprises a sub-stoichiometric combustion of the acid gas stream in a thermal reactor (thermal stage) followed by catalytic conversion in the Claus reactors (catalytic stage). In the Claus section one-third of the total $H_2S$ is oxidized to $SO_2$, which reacts with the remaining $H_2S$ to form sulphur and water according to the following reactions:

$$H_2S + 1.5O_2 \rightarrow H_2O + SO_2 \text{ (oxidation reaction)} \quad (1)$$

$$2H_2S + SO_2 \leftrightarrow 1.5S_2 + 2H_2O \text{ (Claus reaction)} \quad (2)$$

$$3H_2S + 1.5O_2 \leftrightarrow 3H_2O + 1.5\ S_2 \text{ (overall reaction)} \quad (3)$$

The goal of the process is to drive the overall reaction to near completion. In the Claus thermal reactor, the $H_2S$ contained in the acid gas is burnt with air (or with oxygen-enriched air in some specific cases) in a specific burner and only one-third of the total $H_2S$ is oxidized to $SO_2$, while the remaining two-third is not reacted. The total air amount is the one exactly sufficient to oxidize one-third of the total $H_2S$ and to completely oxidize all hydrocarbons and ammonia contained in the feedstock; the molar ratio $H_2S/O_2$ in the feedstock is therefore about 2:1 in order to get a ratio $H_2S/SO_2$ in the Claus tail gas of exactly, or as close as possible to, 2:1, which is the stoichiometric ratio for the Claus reaction, so maximizing Sulphur Recovery Efficiency. During acid gas combustion, a small part of the $H_2S$ (typically 5±7%) is dissociated to hydrogen and sulphur as per following reaction:

$$H_2S \leftrightarrow H_2 + 0.5S_2 \text{ (dissociation or cracking reaction)} \quad (4)$$

According to Clark et al., Alberta Sulphur Research Ltd. (ASRL), hydrogen formation also happens according to the following reaction:

$$4H_2S + O_2 \leftrightarrow 2H_2 + 2H_2O + 2S_2 \text{ (}H_2 \text{ formation reaction)} \quad (5)$$

Several side reactions are also involved, leading to the destruction of ammonia and hydrocarbons and to the formation of carbonyl sulphide COS and carbon disulphide $CS_2$. In order to complete the Claus reactions, a suitable residence time is necessary at high temperature in the thermal reactor.

The Claus thermal reactor is typically followed by a waste heat boiler where furnace effluent is cooled down to about 300° C. and heat is recovered by raising high pressure steam and by a sulphur condenser where process gas is cooled down to sulphur dew point by raising low pressure steam and liquid sulphur is separated.

The Claus thermal stage is generally followed by two or three catalytic stages, each one composed by a gas reheater to bring the gas to the optimal reaction temperature, a catalytic reactor where the Claus reaction takes place and a sulphur condenser where gas is cooled and liquid sulphur is condensed and separated. The Claus reaction is an exothermic equilibrium reaction thermodynamically enhanced by low temperatures. The first Claus catalytic reactor is partly filled with a Claus catalyst (Alumina based) to enhance the Claus reaction and partly filled with a specific high conversion catalyst (Titania based) to enhance the hydrolysis of COS and $CS_2$. The second and third Claus catalytic reactors, if any, are generally filled with Claus catalyst (Alumina based) to enhance Claus reaction.

In order to satisfy the >99% sulphur recovery efficiency normally required for a Sulphur Recovery Plant, the Claus section is generally followed by a Tail Gas Treatment section. Several different alternative processes have been proposed over the years to boost Sulphur Recovery Efficiency, like the SCOT method, the RAR process, the CBA process, the CLINSULF/DEGSULF method or the SSR Selectox process. In the traditional reductive Tail Gas Treatment section, the process gas from a Claus section is preheated and combined with hydrogen from an external source prior to being fed to a hydrogenation reactor, where all sulphur compounds are converted to ELS over a specific reduction catalyst (Co and Mo oxides based), which performs both the hydrogenation and the hydrolysis functions. The reactor effluent is cooled down in the quench tower by means of circulating steam condensate. The $H_2S$ produced in the hydrogenation reactor is recovered in an amine absorber with a specific amine aqueous solution and recycled to the Claus section from the top of an amine regenerator, where the enriched solution is stripped.

The tail gas from the amine absorber is sent to a thermal incinerator for the oxidation of residual $H_2S$ and other sulphur compounds, such as COS and $CS_2$, to $SO_2$ prior to disposal to the atmosphere via a dedicated stack.

The main drawbacks of traditional Claus Plant are the need for large and expensive equipment against very low sulphur economic value, continuous emissions of $SO_x$ ($SO_2$ and $SO_3$), CO, $CO_2$, $NO_x$ plus traces of $H_2S$ into the atmosphere, and continuous import of hydrogen from the network, for process gas reduction in the TGT section.

In some plants, where hydrogen is not available, for example in gas fields, the reducing gas mixture is generated in a reducing gas generator by sub-stoichiometric fuel gas combustion. The main drawback of such alternative configuration is the larger equipment size compared to traditional Claus Plant. This is caused by the 10-15% higher process gas flow rate due to large amounts of inerts coining from in-line fuel gas combustion (mainly nitrogen from air and water and carbon dioxide from combustion).

As mentioned in Clark, Catalysis Communications 5 (2004) 743-747, the recovery of $H_2$ from ELS is a long-standing goal in industry. Clark addresses this by means of the partial oxidation of $H_2S$ over alumina catalysts. Key to this process is said to be the promotion of the reaction of $H_2S$ and $O_2$ under the formation of hydrogen, water, and sulphur at a controlled temperature by means of an external oven. Reduction of emissions into the atmosphere is not addressed.

Some alternative processes have been proposed over the years, which are addressed to thermal or catalytic partial oxidation of $H_2S$.

U.S. Pat. Nos. 6,946,111 and 6,800,269 by Conoco Inc. disclose processes for removing $H_2S$ from a $H_2S$-containing gas stream the first one and from a $H_2S$-rich waste gas stream the second one, comprising a flameless short contact time reactor filled with a suitable catalyst for partial oxidation reaction of $H_2S$ to form sulphur and water, using air or enriched air or pure oxygen with a $H_2S/O_2$ ratio in the feedstock of approximately 2:1, followed by a cooling zone and by a sulphur condenser. The main goal of the first patent is to de-sulphurize a gas stream, while the main goal of the second patent is to propose an alternative solution to the traditional thermal reactor in a Claus Plant. Both patents are based on hydrogen sulphide catalytic partial oxidation reaction with oxygen to form sulphur and water.

U.S. Pat. No. 7,560,088 by Conoco Phillips Company discloses a process for removing sulphur from a $H_2S$-containing gas stream using a compact system comprising a flameless short contact time catalytic partial oxidation reaction zone followed by a temperature-control zone, a first Claus catalytic reaction zone, a second temperature-control zone, a first liquid sulphur outlet and a first effluent gas outlet. The main goal of this patent is to propose an alternative solution to traditional Claus Plant based on hydrogen sulphide catalytic partial oxidation to form sulphur and water.

U.S. Pat. No. 4,481,181 by GA Technologies Inc. discloses a process for removing sulphur and recovering hydrogen from a $H_2S$-containing gas stream coupling thermal partial oxidation of $H_2S$ to sulphur and water and thermal dissociation of $H_2S$ to hydrogen and sulphur in the same reaction zone, preceded by feedstock heating section and followed by a cooling zone and by a sulphur condenser, using pure oxygen and a substantial proportion of nitrogen with a $H_2S/O_2$ ratio in the feedstock between 10:1 and 25:1. The main goal of this patent is to thermally decompose by partial oxidation and dissociation hydrogen sulphide into sulphur and hydrogen.

WO2010/141496 by Chevron U.S.A. Inc. and Drexel University discloses a method for performing $H_2S$ thermal dissociation at temperature below 1600° C. based on H and SH radicals, in one embodiment over a suitable plasma catalyst.

Furthermore, Italian Patent 1 203 898 by Siirtec-Nigi discloses a process called HCR based on the operation of the traditional Claus thermal reactor at a slightly higher $H_2S/O_2$ ratio in the feedstock in order to keep a $H_2S/SO_2$ ratio in the Claus tail gas significantly higher than 2:1. The main goal of this process is to boost hydrogen production in thermal reactor and to avoid hydrogen import in the TGT section. Also with such a process, Sulphur Recovery Plant emissions are not avoided.

From the above discussion, it is evident that several efforts have been made in the past, trying to propose a valid alternative to traditional Claus Plant. In particular, some processes which have been proposed over the years are based on the thermal or catalytic partial oxidation of $H_2S$, while some other processes are focused on the thermal or catalytic cracking of $H_2S$. None of the proposed processes is conceived and arranged to perform $H_2S$ conversion to hydrogen and sulphur over a suitable catalyst able to favour both reactions at the same time.

In WO2012/154041, a method is described for the production of hydrogen from a $H_2S$-containing gas stream, comprising subjecting the gas stream to catalytic oxidative cracking so as to form $H_2$ and $S_2$. The invention described therein serves to address the problem of gas emissions into the atmosphere and producing at the same time a valuable hydrogen export stream.

An issue with $H_2S$-containing gas streams as these are regularly provided to sulphur recovery facilities, is the co-presence of methane and/or heavier hydrocarbons. In particular, methane is prone to being converted in sulphur compounds such as $CS_2$ or COS, which is undesirable.

Another issue with $H_2S$-containing gas streams as these are regularly provided to sulphur recovery facilities, is the co-presence of ammonia. The ammonia is typically converted in the thermal stage of the Claus plant. However, the thermal conversion of ammonia embodies a risk, occurring upon incomplete burning, of the formation of solid salts such as ammonium sulphides or sulphites. These salts cause blockage in the coldest sections of the Claus plant, in particular in the sulphur condensers. In order to burn the ammonia properly, a homogeneous mixture of ammonia and air is required, along with a high flame temperature. However, the formation of nitrogen oxides encourages the oxidation of sulphur dioxide, $SO_2$, to sulphur trioxide, $SO_3$. The Claus catalyst then becomes sulphided and the cold portions of the unit are seen to corrode.

WO2014/073966 provides a catalyst that is active and selective in the oxidative cracking of $H_2S$ particularly in the event of the concomitant presence of $NH_3$ and/or $CH_4$, and more generally, carbon containing compounds. The catalyst comprises iron and molybdenum on a carrier comprising aluminium, e.g. alumina.

However, reducing the sintering tendency at high temperatures remains a challenge in the field of catalytic oxidative cracking of hydrogen sulphide. In another aspect, it is desirable to increase the stability of the catalyst, for example by reducing the vapour pressure of the active phases at high temperatures during catalytic oxidative cracking of hydrogen sulphide. In one additional aspect, a higher stability is particularly desired to meet the ever more stringent market requirements for the End Of Run (EOR) conditions of the catalyst. In this respect, it is particularly favourable to reduce the ammonia concentration at the outlet of the reactor.

If one or more of these challenges is tackled, the catalyst is more stable at high temperatures than described in the prior art. In some aspects of the invention, this advancement would lead to a higher conversion of $H_2S$ during the reaction. Furthermore, a higher stability at high temperatures may also result in prolonged lifetimes of the catalyst.

As further background art, reference is made to Jirátová et al. Chinese Journal of Catalysis, volume 37, pages 258-267. This refers to hydrodesulfurization activities of a NiMO catalysts supported on mecahnochemically prepared Al-CE mixed oxides. The active metal herein is $NiMo_6$.

SUMMARY OF THE INVENTION

In order to better address one or more of the foregoing desires, the invention presents, in one aspect, a catalyst composition suitable for the catalytic oxidative cracking of a $H_2S$-containing gas stream, the catalyst composition comprising at least one active metal selected from the group consisting of Fe, Co, Ni, and combinations thereof, supported by a carrier comprising ceria and alumina, and preferably with the proviso that the active metal does not comprise $NiMo_6$. This proviso is preferred for the catalyst product as such and is optional for the catalyst as used in the plant, in the hydrogen production method, and for the catalyst prepared in the catalyst preparation method as described herein. The catalyst as comprised in the plant, as used in the hydrogen production method or as prepared with the catalyst preparation method in some embodiments comprise $NiMo_6$ and some other embodiments are different from $NiMo_6$.

The invention also pertains to a method for the production of hydrogen from a $H_2S$-containing gas stream, comprising subjecting the gas stream to catalytic oxidative cracking so as to form $H_2$ and $S_2$, using a catalyst comprising at least one active metal selected from the group consisting of iron, cobalt, nickel, and combinations thereof, wherein said active metal is supported by a carrier comprising ceria and alumina.

In another aspect, the catalyst compositions of the invention are suitable for the catalytic oxidative cracking of a $H_2S$-containing gas stream in the event of a concomitant presence of $NH_3$ and/or $CH_4$, and/or carbon containing compounds. In yet another aspect, the $H_2S$-containing stream may further comprise compounds selected from the group consisting of COS, RSH, HCN, benzene, toluene, ethylbenzene, and xylene.

In another aspect, the invention pertains to a method of making a catalyst as defined above or as used in said method, comprising providing an aqueous solution of precursors for nickel, selected from the group consisting of nickel tetracarbonyl, nickel nitrates, nickel bromides, nickel chlorides, nickel fluorides, nickel phosphates, nickel sulphates, nickel acetylacetonates, nickel acetates, nickel fumarates, nickel gluconates, nickel citrates, nickel benzoates, nickel maleates, nickel oxalates, nickel oleates, nickel stearates, nickel-ammonium complexes, iron tetracarbonyl, iron pentacarbonyl, iron nonacarbonyl, iron nitrates, iron bromides, iron chlorides, iron fluorides, iron phosphates, iron sulphates, iron acetylacetonates, iron acetates, iron fumarates, iron gluconates, iron citrates, iron benzoates, iron maleates, iron oxalates, iron oleates, iron stearates, iron stearates, iron-ammonium complexes, cobalt tetracarbonyl, cobalt pentacarbonyl, cobalt nonacarbonyl, cobalt nitrates, cobalt bromides, cobalt chlorides, cobalt fluorides, cobalt phosphates, cobalt sulphates, cobalt acetylacetonates, cobalt acetates, cobalt fumarates, cobalt gluconates, cobalt citrates, cobalt benzoates, cobalt maleates, cobalt oxalates, cobalt oleates, cobalt stearates, and cobalt-ammonium complexes.

In a still further aspect, the invention provides a method for the production of hydrogen from a $H_2S$ and optionally $NH_3$ and/or $CH_4$-containing gas stream, comprising subjecting the gas stream to catalytic oxidative cracking so as to form $H_2$ and $S_2$, using a catalyst as defined above.

The invention also pertains to a plant suitable for conducting the catalytic oxidative cracking of a $H_2S$-containing gas stream, said plant comprising an inlet for a $H_2S$-containing acid gas stream, an inlet for an oxygen-comprising stream, and a Catalytic Oxidative Cracking reaction zone, comprising a catalytic material suitable for $H_2S$ partial oxidation and cracking, wherein the catalytic material comprises one or more catalysts at least one active metal selected from the group consisting of Fe, Co, Ni, and combinations thereof, supported by a carrier comprising ceria and alumina; preferably wherein the catalyst is as defined above.

DETAILED DESCRIPTION OF THE INVENTION

The invention, in a broad sense, is based on the recognition of a judicious combination of at least one catalytically active metal selected from the group consisting of nickel (Ni), iron (Fe), cobalt (Co), and mixtures thereof, with a support comprising ceria and alumina. Preferably, the catalyst composition comprises Ni, more preferably the active metal is Ni, i.e., the sole active metal is nickel in any suitable form, such as a sulphide.

It is believed that a support comprising ceria and alumina lowers the sintering tendency. Surprisingly, the compositions of the invention result in a reduced vapour pressure of the active phase comprising the active metal, preferably in its sulphide form at the desired reaction conditions. Without wishing to be bound by theory, it is believed that the lowered sintering tendency and/or the reduced vapour pressure of the active phase lead to an improved thermal stability. In turn, this higher thermal stability is believed to result in improved catalytic performance as higher conversions can be obtained. Moreover, prolonged lifetimes of the catalysts are also a result of the higher thermal stability.

In another aspect, the catalysts of the invention are believed to be advantageous in terms of End of Run conditions. When compared to previously disclosed catalysts operating for a similar duration, the catalysts of the invention are able to reduce the ammonia concentration at the outlet of the reactor. Or, alternatively, when used with reference to obtaining the same ammonia concentration as obtained by using previously disclosed catalysts, the novel catalysts are stable for a longer period of time.

A supported catalyst will be understood as pertaining to a catalyst composition comprising a catalytically active part (i.e. particles as provided that are either active, or are converted into an active phase in situ), and a catalytically non-active part, wherein the catalytically non-active part (the support) generally forms the majority of the catalyst. This distinguishes a supported catalyst from a bulk-catalyst, in which the catalytically non-active part is generally the minority. Thus, in a supported catalyst, the catalytically non-active part is generally more than 50% by weight of the catalyst composition. Preferably the support forms more than 60% by weight, more preferably more than 70% by weight, and most preferably more than 80% by weight, of the total catalyst composition. In some embodiments, the support does not form more than 90% by weight of the total composition, more preferably not more than 87% by weight, most preferably not more than 83% by weight.

The catalytically active part of the catalyst composition comprises at least one element of period 4 of the VIIIB group. In particular, the active metal is selected from the group consisting of Fe, Co and Ni. The metal is typically present in the form of particles dispersed onto the support, in an amount of at least 1 wt. % and generally up to 50 wt. % by weight of the catalyst composition. The support comprises alumina, i.e., ($Al_2O_3$). The alumina can be, e.g., alpha- or theta or gamma-alumina. Furthermore, the support comprises ceria ($CeO_2$).

The support typically comprises ceria and alumina in a weight ratio for ceria $$\left(\text{i.e. } \frac{\text{weight of ceria}}{\text{weight of ceria} + \text{weight of alumina}} \times 100\%\right)$$

of 2% to 50%, preferably in a ratio of 5% to 40%, more preferably 10% to 30%.

The catalytically active metal in its sulphided form is present in the catalyst composition in a range typically of 1 to 40% by weight, preferably from 3 to 35% by weight, more preferably from 5 to 30% by weight, most preferably from 8 to 25% by weight, for example 17% by weight as compared to the total weight of the catalyst composition when the catalyst is present as a powder, or compared to the total weight of the catalytic layer when the catalyst comprises a mechanical substrate.

In some embodiments, the appropriate reaction chamber can be charged with unsulphided catalyst and the active metal can be sulphided by exposing the catalyst to the gas stream to be treated for a certain time, preferably from 3 to 12 hours in order to sulphide the active metal and activate the catalyst.

The catalyst may consist essentially of the catalyst composition, i.e. the alumina- and ceria-containing carrier, and the active metal contained thereon. If so, the catalyst will generally be in a suitably shaped form, e.g. a powder, a sphere or a pellet. The catalyst may also, in addition to the catalyst composition comprising a carrier or support and the active metals, contain a mechanical support structure, i.e. a substrate.

It will be understood that such a substrate is not part of the catalyst composition as defined above, but comes in addition thereto. A substrate may be any structure known in the art as a substrate for catalysts. In one embodiment of the present invention, the substrate may be in the form of beads, pellets, spheres, honeycomb monolith or open cell foams. The substrate may be formed from alumina, silica alumina, silica, titania, mixtures thereof, or any other suitable material as available in the field of catalyst substrates.

If the catalyst comprises a substrate, then this will typically be coated with the supported catalyst composition of alumina, ceria, and at least one active metal as defined above.

In a preferred embodiment, the catalytically active metal is in the form of its sulphide. For example, nickel preferably is in the form of nickel sulphide, iron preferably is in the form of iron sulphide, and cobalt is preferably in the form of cobalt sulphide.

The catalyst composition of the invention can be prepared in a manner known to the skilled person. Reference is made, e.g., to "Catalyst Handbook", M. V. Twigg (Ed.), Wolfe Publishing Ltd, 1989, and to "Structured Catalysts And Reactors", A. Cybulski and J. A. Moulijn (Eds.), Marcel Dekker Inc., 1998—Chapter 21 (Transformation of a structured carrier into structured catalyst), pp. 599-615.

In a particularly suitable method, an aqueous solution is provided of a precursor, and dispersing the solution onto a carrier material. Examples of nickel-containing precursors are inorganic and organic nickel salts, nickel chelates, nickel clusters, nickel hydroxides and oxi-hydroxides, and nickel organometallic complexes. Representative of these compounds are nickel tetracarbonyl, nickel nitrates, nickel bromides, nickel chlorides, nickel fluorides, nickel phosphates, nickel sulphates, nickel acetylacetonates, nickel acetates, nickel fumarates, nickel gluconates, nickel citrates, nickel benzoates, nickel maleates, nickel oxalates, nickel oleates, nickel stearates, nickel-ammonium complexes, and the like. In one aspect, the catalyst precursors comprise at least one metal selected from the group consisting of Ni(0), Ni(I), Ni(II), Ni(III), and Ni(IV). Preferably Ni(II) is used. Examples of iron-containing precursors are inorganic and organic iron salts, iron chelates, iron clusters, iron hydroxides and oxi-hydroxides, and iron organometallic complexes. Representative of these compounds are iron tetracarbonyl, iron pentacarbonyl, iron nonacarbonyl, iron nitrates, iron bromides, iron chlorides, iron fluorides, iron phosphates, iron sulphates, iron acetylacetonates, iron acetates, iron fumarates, iron gluconates, iron citrates, iron benzoates, iron maleates, iron oxalates, iron oleates, iron stearates, iron stearates, iron-ammonium complexes and the like. In one aspect, the catalyst precursors comprise at least one metal selected from the group consisting of Fe(0), Fe(I), Fe(II), Fe(III), Fe(IV), Fe(V), Fe(VI), and Fe(VII). Preferably, Fe(II) and/or Fe(III) is used. Examples of cobalt-containing precursors are inorganic and organic cobalt salts, cobalt chelates, cobalt clusters, cobalt hydroxides and oxi-hydroxides, and cobalt organometallic complexes. Representative of these compounds are cobalt tetracarbonyl, cobalt pentacarbonyl, cobalt nonacarbonyl, cobalt nitrates, cobalt bromides, cobalt chlorides, cobalt fluorides, cobalt phosphates, cobalt sulphates, cobalt acetylacetonates, cobalt acetates, cobalt fumarates, cobalt gluconates, cobalt citrates, cobalt benzoates, cobalt maleates, cobalt oxalates, cobalt oleates, cobalt stearates, and cobalt-ammonium complexes and the like. In one aspect, the catalyst precursors comprise at least one metal selected from the group consisting of Co(0), Co(I), Co(II), Co(III), Co(IV), and Co(V). Preferably, Co(II) is used. The catalyst precursors may further comprise organic ligands or anions such as acetate, citrate, EDTA (ethylene diamine tetra acetate) or NTA (nitrilo triacetate).

In a particularly preferred embodiment, the carrier is first calcined prior to the impregnation with a solution of the precursor. Calcination is preferably performed at a temperature higher than 700° C., more preferably at least 750° C., even more preferably in the range 750-1100° C., most preferably in the range 900-1100° C. The duration of the calcination process at the desired temperature is preferably in a range of 10 to 30 hours, more preferably in a range of 13 to 30 hours. The calcination process is preferably performed under isothermal conditions. Preferably, the calcination is performed in the presence of oxygen, more preferably, in air. After the calcination, the active catalyst metal is applied to the calcined support as described above. For example, wet impregnation or precipitation of the catalytic metal can be used. Without wishing to be bound by theory, it is believed that the calcination as described above allows to stabilize the structure of the catalyst. In this way, the obtained catalyst is particularly suitable for the high temperatures, e.g. 1100° C., involved in the catalytic oxidative cracking. In this embodiment, it is important to do the calcining step first to produce a stabilized support and subsequently apply the catalytic metal to it. If the process is carried out in reverse, it is believed that the catalyst structure could change in the way that the catalytic metal would not be available for the catalytic reaction.

Preferably, another step of calcination is performed after deposition of the active phase. In some aspects, this additional step of calcination may be carried out under the same conditions and following the same procedures as mentioned above for the first step of calcination.

The invention further pertains to a method for the production of hydrogen from a $H_2S$-containing gas stream, comprising subjecting the gas stream to catalytic oxidative cracking so as to form $H_2$ and $S_2$, using a catalyst as defined above.

It is emphasized that the catalytic oxidative cracking in accordance with this aspect of the invention is a fundamentally different process from both the thermal stage and the catalytic stage in an existing Claus-type process. With reference to the reaction equations (1) to (5) mentioned above, the Claus processes are directed to driving the above reaction (3) to near completion. The present invention is based on the judicious insight to provide a process based on the side reactions (4) and (5), and to promote these reactions for the production, from a $H_2S$-containing gas-stream, of both hydrogen and sulphur.

The process of the invention is also fundamentally different from the recent proposals by Clark et al. The references authored by the latter, are based on a theory of direct oxidation of $H_2S$ under the formation of hydrogen, water and sulphur. The resulting conversion, whilst avoiding the formation of $SO_2$, is subject to improvement as to the conversion of $H_2S$ and the production of sulphur concurrently with 112.

In the present invention a Catalytic Oxidative Cracking (COC) stage substitutes the Claus thermal stage and/or both the Claus thermal stage and the Claus Catalytic Stages. The process of the invention thus favours $H_2S$ dissociation and partial oxidation instead of complete oxidation and Claus reaction. However, it is not excluded to add a Claus thermal stage and/or a Claus catalytic stage after the COC stage.

The catalytic oxidative cracking is conducted in one or more reaction zones, preferably provided in one reaction chamber. Throughout the text the term "chamber" may relate to one or more reaction zones. A reaction chamber is defined as a reactor volume with optionally a catalyst bed. In a single reaction chamber there is only a single type of catalyst. Typically, the reaction chamber is substantially cylindrical and the reactant flow is in the axial direction. If the reaction chamber comprises a catalyst bed, one or more reactions may take place in the axial direction of the gas flow. In an embodiment where more than one reaction is taking place, the reaction conversion profile for one reaction may be different from that from another reaction. In other words, one reaction may be taking place, e.g., mostly at the beginning of the catalyst bed, whilst the other reaction may take place, e.g., over the total length of the catalyst bed.

The invention presents the skilled person with the insight to promote the above-mentioned reactions (4) and (5). The fact that thereto the gas stream is to be subjected to catalytic oxidative cracking, implies a clear message to the skilled person as to how to carry this out.

In general, the catalyst will be provided, in a conventional manner, on a catalyst bed over which the gas stream to be treated is led. The choice of the types of beds and volumes thereof are well within the ambit of the skilled person's normal capabilities.

The Catalytic Oxidative Cracking reaction zone or zones are provided with oxygen. The oxygen is preferably provided as a gas enriched with oxygen as compared to air. Preferably, this is an oxygen-containing gas-stream comprising at least 40 vol. % oxygen, preferably at least 60 vol. % oxygen. More preferably, this oxygen is provided as substantially pure oxygen, viz. 90 vol. %-99 vol. % of oxygen, or as close to 100% as available.

The use of oxygen-enriched gas, and preferably pure oxygen, is not only related to optimizing the catalytic oxidative cracking process, it also presents advantages such as the avoidance of an unnecessarily large equipment, which would be needed on account of the presence of large volumes of inert (nitrogen) gas. Moreover, with reference to the invention's purpose to produce hydrogen, in addition to sulphur recovery and with reduced emissions, it will be advantageous to reduce, and preferably avoid, the presence of nitrogen in the tail gas of the process.

The quantity of oxygen fed to the reactor is selected so as to achieve a ratio $H_2S/O_2$ in the feedstock higher than the typical figure of about 2:1. Preferably, $H_2S/O_2$ ratio in the feedstock should be in the range 2:1-6:1 or preferably higher than 2:1 and up to 6:1, more preferably in the range 3:1-5:1, still more preferably in the range 3.5:1-4.5:1, even more preferably in the range 3.9:1-4.7:1, most preferably in the range 4:1-4.5:1.

In the preferred embodiment of operating the catalytic oxidative cracking on the basis of a ratio $H_2S/O_2$ between 4:1 and 4.5:1, most preferred between 4.1:1 and 4.5:1, preferred reaction temperatures to obtain simultaneously cracking and partial oxidation of $H_2S$ are in the range 700° C.-1300° C., preferably in the range of 800° C.-1300° C., more preferably in the range of 950° C.-1250° C. Most preferably a temperature in the range of 1050-1100° C. is obtained.

In one embodiment, the molar ratio of $NH_3/O_2$ in the feedstock is between 0.1 and 1.5. Preferably, the molar ratio of $NH_3/O_2$ in the feedstock is between 0.1-1.2, more preferably between 0.1-1, most preferably between 0.3-1.

In one embodiment, the feedstock to Catalytic Oxidative Cracking reaction zone or zones ($H_2S$-containing acid gas and oxygen-containing gas) is preheated in order to increase the reaction temperature, to boost hydrogen production and to depress $SO_2$ formation.

In one embodiment of the present invention, the $H_2S$-containing acid gas and the oxygen-containing gas are mixed in a static mixer just before entering the catalytic bed of the Catalytic Oxidative Cracking reaction zone or zones.

In one embodiment the hydrogen concentration in the effluent of the reaction chamber (after quenching) is at least 3 vol %, preferably at least 5 vol % most preferred at least 7 vol %.

It should be noted that the reaction preferably is conducted autothermally. This refers to the fact that, whilst the process is preferably adiabatic, heat exchange takes in fact place, since the oxidation reaction is exothermic, and the cracking reaction is endothermic, whereby heat made available through the exothermic reaction is utilized in the endothermic reaction.

All in all, the process of the invention, by virtue of the judicious choice of catalyst, is believed to favour reactions (4) and (5) relative to reactions (1) and (2), leading to lower $H_2S$ conversion, but on the other hand to significantly higher $H_2$ formation and to much lower $SO_2$ formation. As a consequence of the lower $H_2S$ conversion, a higher acid gas recycle rate from $H_2S$-containing gas source (e.g. an amine regenerator) to reaction chamber is obtained as compared to a traditional Claus Plant.

The catalytic oxidative cracking process of the invention serves to reduce the temperature so as to provide the required reaction equilibrium. This results in increasing the hydrogen yield and minimizing $SO_2$ formation, which in turn serves to minimize hydrogen consumption in the Tail Gas Treatment section to reduce $SO_2$ to $H_2S$.

Preferably, the reaction zone is separately fed with $H_2S$-containing acid gas and the oxygen-containing gas, and these gases are mixed prior to entering the catalytic bed.

The gas effluent from the reaction chamber is preferably quenched so as to avoid recombination of $H_2$ and $S_2$ to form $H_2S$, viz, by the inverse reaction of (4), which would make the process sub-optimal in terms of overall conversion. Preferably this quenching is done substantially instantaneously. The quenching is preferably to a temperature lower than 950° C., preferably in the range 600-850° C. The residence time in the quench zone is preferably as short as possible, typically of from 10 ins to 300 ms, preferably from 10 ms to 100 ms, more preferably from 10 ms to 50 ms.

The quench zone (which could be a zone of the reaction chamber) is preferably followed by a waste heat boiler and a sulphur condenser to cool down the process gas and to recover liquid sulphur. The latter is preferably done by raising high or medium pressure steam in the waste heat boiler and low or medium pressure steam in the sulphur condenser.

In one embodiment, the quenching of the gas effluent from the reaction chamber is achieved by mixing with water in the final part of the reaction chamber and, the mixing of the gas with water is performed with a water sprayer in a suitable mixing chamber just below the catalytic bed. In a most preferred embodiment the quench (in the sense of fast cooling) is done in the first part of a two-zone waste heat boiler. In this zone with short tubes the gas will typically arrive to temperature in the range of about 600-700° C. and in the second with conventional tubes it arrives to 300-350° C.

Although the process of the invention substantially reduces the formation of $SO_2$, it will be inevitable that some $SO_2$ is formed. In order to remove such $SO_2$, the Catalytic Oxidative Cracking stage is preferably followed by a Tail Gas Treatment (TGT) section, in the hydrogen production method and in the plant of the invention. The TGT section comprises for instance an absorber. The TGT section comprises for instance a hydrogenation reactor, for example upstream (for the gas stream) of the absorber. For example a part (e.g. about 10-15%) of the produced hydrogen is consumed in order to reduce residual $SO_2$ to $H_2S$ in the hydrogenation reactor. Due to the much higher hydrogen content and to the much lower $SO_2$ content in the tail gas compared to traditional Claus Plant, the reduction step of the Tail Gas Treatment section can be performed without any hydrogen import.

The tail gas is preferably preheated and fed to a hydrogenation reactor. Therein the $SO_2$, as well as other residual sulphur compounds, such as COS and $CS_2$, are converted into $H_2S$, which is then removed. This removal of $H_2S$ from the tail gas downstream of the hydrogenation reactor can be done in a conventional manner, e.g., by scrubbing the gas with a lean amine solution in an absorber, such as a TGT absorber.

In one embodiment, the Catalytic Oxidative Cracking stage in the hydrogen production method and the plant of the invention is followed by one Claus catalytic stage, comprising a gas reheater, a Claus catalytic reactor and sulphur condenser (in this order with respect to the gas stream), in order to convert most of the $SO_2$ into sulphur, thereby minimizing $H_2$ consumption for $SO_2$ reduction in the Tail Gas Treatment (TGT) section. In the plant, the Claus catalytic stage is for instance arranged downstream (for the gas stream) of the COC zone and upstream (for the gas stream) of the TGT section.

In one embodiment, the hydrogen stream obtained from the TGT absorber is sent to battery limit, (e.g. to end users), of for instance to a unit selected from the group consisting of hydrotreaters, hydrocrackers or hydrodesulphurizers. It should be noted that the composition of the hydrogen rich stream from the top of the TGT absorber may be different depending on variables such as SRU feedstock quality (e.g. composition of the $H_2S$-containing gas stream provided to the COC reaction zone), plant configuration and operating conditions, and may include traces or percentages of $H_2O$, $N_2$, CO, $CO_2$, $H_2S$, COS and $CS_2$.

In a preferred embodiment, a hydrogen stream obtained from the TGT absorber (e.g. the gas stream from the top of the TGT absorber) is further purified in a Hydrogen Purification section (for example a Pressure Swing Absorber). It should be noted that, prior to purification, the composition of a hydrogen rich stream from the top of the TGT absorber may be different depending on variables such as SRU feedstock quality (e.g. composition of the $H_2S$-containing gas stream provided to the COC reaction), plant configuration and operating conditions, and may include traces or percentages of $H_2O$, $N_2$, CO, $CO_2$, $H_2S$, COS and $CS_2$.

The purified hydrogen is sent to battery limit, or for instance to one or more units selected from the group consisting of hydrotreaters, hydrocrackers and hydrodesulphurizers.

The hydrogen production method optionally comprises a step of providing a $H_2S$-containing gas stream. The gas stream is for instance obtained from an amine regeneration system and/or from a sour water stripper. The method optionally comprises a step of regenerating an amine-based absorbent in an amine regeneration system, for instance by heating, thereby providing regenerated absorbent and a $H_2S$-containing gas stream, wherein the $H_2S$-containing gas stream is supplied to the COC reaction.

The plant of the invention is for instance a Sulphur Recovery Unit (SRU), for instance having an inlet for the $H_2S$-containing gas stream connected to an inlet of an Amine Regeneration Systems and/or to a Sour Water Stripper. Optionally, the plant of the invention comprises Amine Regeneration Systems and/or to a Sour Water Stripper having an outlet for the $H_2S$-containing gas stream connected to an inlet of the Catalytic Oxidative Cracking reaction zone. In some embodiments, the plant comprises a COC unit comprising a catalyst bed comprising the COC catalyst (having a catalyst composition as discussed for the hydrogen production method), and a quench unit downstream of the reaction chamber, and preferably a static mixer upstream of the COC reaction chamber. The static mixer has for instance one or more inlets for the $H_2S$-containing gas stream and one or more inlets for the oxygen-containing gas.

Figure 1:
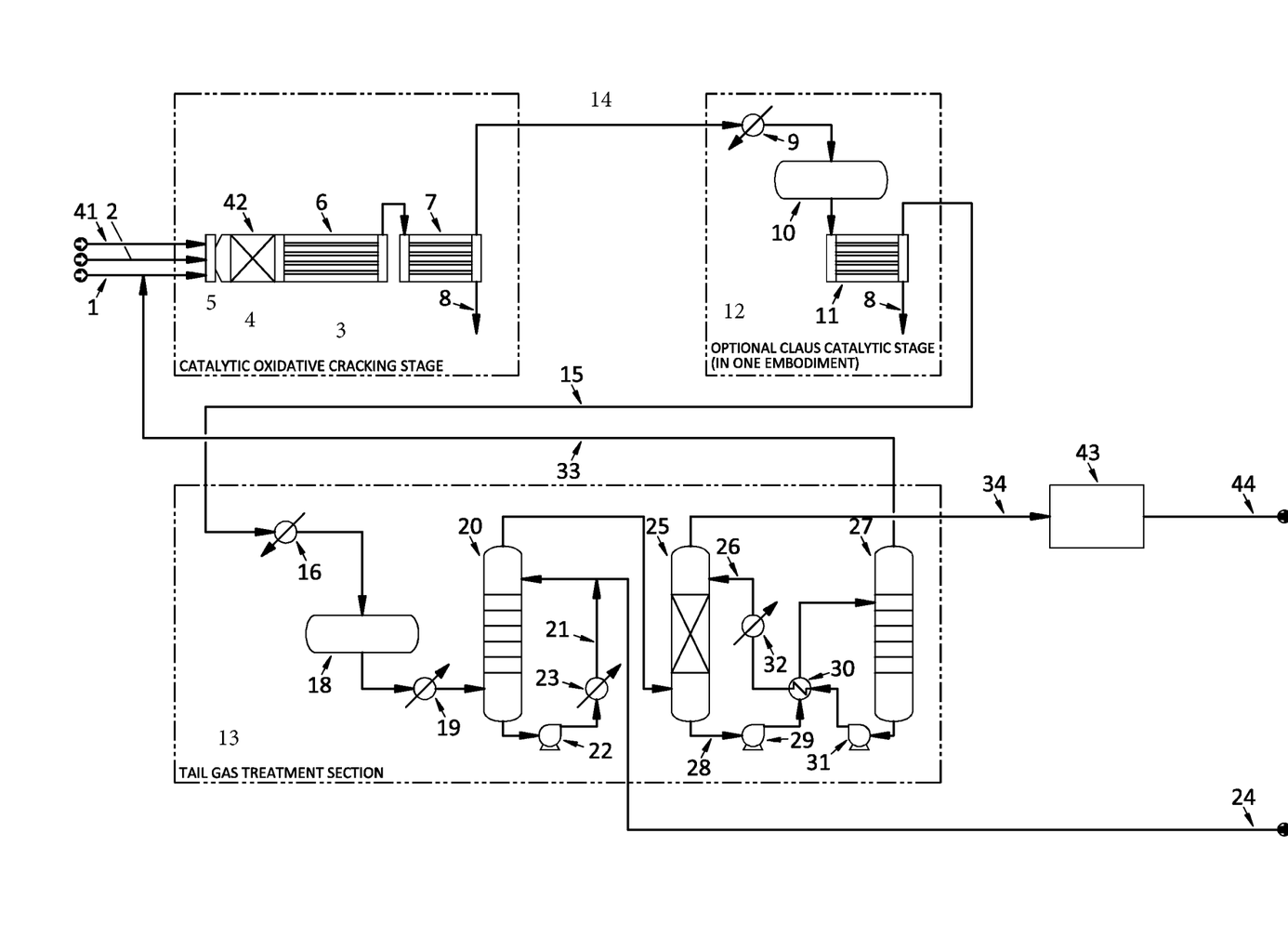
FIG. 1 schematically illustrates an example plant according to the invention.

FIG. 1 schematically illustrates an example plant according to the invention.

The COC stage (3), or COC section (3), comprises a COC unit (4) comprising the COC reaction chamber (42), which chamber comprises a catalyst bed with the COC catalyst having the composition as described herein. The COC unit further comprise a waste heat boiler (6) for cooling, e.g.

quenching, the reactor effluent and raising steam; the boiler (6) is for instance a shell-and-tube heat exchanger. The COC unit (4) further comprises the preferred static mixer (5) upstream of the COC chamber for mixing acid gas with oxygen-containing gas (41), the acid gas is e.g. acid gas (1) from one or more amine regeneration units and/or acid gas (2) from one or more sour water strippers. The COC stage (3) further comprises a (first) sulfur condenser (7), e.g. a heat exchanger, having an outlet (8) for sulfur and an outlet (14) for gas that is in fluid commination with to an inlet of the TGT section, optionally (as illustrated) through the optional Claus catalytic stage (12), in particular to the reheater (9) of that stage. The reheated gas is supplied to the first catalytic Claus reactor (10) which has an outlet connected to a second sulfur condenser (11) which also has an outlet (8) for sulfur and an outlet for gas (15) which is supplied to the TGT section (13).

The preferred TGT section as illustrated comprises an absorber (25) having an inlet in fluid communication with said outlet (14) for gas of the COC section (3) for removing $H_2S$ from the gas stream from the COC section or from the optional Claus section. The TGT section further preferably comprises a regenerator (27) for regenerating rich absorption liquid from the absorber. More preferably the TGT section (13) comprises an optional TGT pre-heater (16) receiving gas from the optional second sulfur condenser (11) or from the first sulfur condenser (7), and having an outlet connected to a preferred hydrogenation reactor (18) which optionally comprises a hydrogenation catalyst and optionally does not have any inlet for external $H_2$ feed. The hydrogenation reactor has an outlet for gas connected to an optional TGT waste heat boiler (19) for cooling the gas by heat exchange with e.g. boiler feed water, which has an outlet connected to a quench tower (20). In the quench tower (20), the gas is cooled by circulation of condensate (21). The quench tower has an outlet at the top for gas that is connected to an inlet of the absorber (25) wherein e.g. lean amine solution (26) is circulated for absorption of remaining $H_2S$ in the gas stream. The absorber (25) has an outlet for gas (34) at the top, which gas stream (34) is rich in hydrogen. Optionally, the gas stream is further purified in a purifier (43) such as a pressure swing adsorption unit to give a purified hydrogen product stream (44). The absorber (25) has an outlet (28) for absorption liquid at the bottom connected, through a pump (29) and a heat exchanger (30) to the amine regenerator (27) where the solution is regenerated e.g. by heating. The amine regenerator (27) is for instance a column, e.g. configured for stripping of the amine solution, and has for instance an outlet for gas (33) at the top, which gas is supplied e.g. to the COC stage (3), and an outlet for regenerated or lean amine absorbent which is supplied to the absorber (25), e.g. through a pump (31), through the heat exchanger (30), for heat exchange with the rich amine solution, and through a cooler (32). The quench tower (20) further has an outlet at the bottom for liquid, e.g. quench water, which is in part recirculated, preferably through a pump (22) and a cooler (23), and which is in part (24) purged and sent to battery limit. The regenerator (27) is for instance separate from and additional to the amine regeneration unit that is the source of the acid gas (1), or for instance the regenerator (27) treats absorbent from additional absorbers than absorber (25), or for instance the absorber (25) is used not only for the gas stream from quench (20) but also for some net source of acid gas.

The overall source, or external source, of acid gas of the hydrogen production method and plant of the invention is for instance an acid-gas emitting process, e.g. a process for treating natural gas or a crude oil refining process, or is for instance an acid-gas emitting plant such as a refinery, a natural gas processing plant, a gasification plant or a synthesis gas plant. The acid-gas emitting process or plant comprises e.g. removal of sulphur components from a stream, such as from natural gas and flue gas, e.g. using absorption and desorption, wherein for instance the desorption is carried out using the amine regenerator providing the acid gas (1).

The hydrogen production method is preferably carried out in a plant as described. Preferences for the catalyst composition and catalyst preparation method apply equally for the catalyst comprised in the catalytic bed of the plant and as used in the hydrogen production method.

EXAMPLES

The invention will be illustrated with reference to the following, non-limiting Examples.

Example 1—Preparation of the Catalyst

NiS-based catalysts with a sulphide nominal load ranging between 9 wt % and 25 wt % were prepared with the incipient wetness impregnation of the support comprising alumina and ceria.

An aqueous solution of a suitable precursor salt of cerium nitrate and $Al_2O_3$ in powder were used in the preparation procedure of the cerium oxide supported on aluminum oxide. The $Al_2O_3$ support was previously pretreated at 600° C. (10° C./min) for 2 h.

In order to prepare the different samples, an aqueous solution of a suitable precursor salt of cerium at an appropriate concentration was used to impregnate 10 g of support. This solution was placed on a stirring and heating plate at 100° C. for half an hour. After that, the samples were dried and calcined in air at 1100° C. for a period of time in the range of from 15 to 30 hours.

For the Ni impregnation on the cerium/alumina support, an aqueous solution of nickel-nitrate hexahydrate with a molar concentration in a range of from 1-3 M was used. Also in this case, the solution was placed on a heating plate at 100° C. for half an hour. After that the samples were dried and calcined in air at 1100° C. for 15 h. After the calcination, the catalysts were reduced to the desired granulometry and sulphided. Generally for such procedure, a gas stream enriched in $H_2S$ concentration between 5 to 50 vol % must be fed to the reactor during a heating ramp between 2° C./min and 40° C./min up to a temperature between 800 and 1200° C. from 1 to 8 hours.

In particular, the sulphidation treatment was performed for lab-scale testing in a quartz reactor containing the catalyst to be sulphided. In particular, the activation step has been realized by feeding a gaseous stream containing $N_2$ and $H_2S$ at 20 vol %, by increasing the temperature up to 1000° C. with a heating rate of 20° C./min for 2 h in isothermal conditions.

Example 2—Lab-Scale Testing of the Catalyst

The laboratory process involves the reaction of $H_2S$ with oxygen in a substoichiometric ratio for the simultaneous production of elemental sulphur and hydrogen. A portion of $H_2S$ is reacted with oxygen in an exothermic reaction that generates heat utilized from the unreacted $H_2S$ for a strongly endothermic reaction.

In particular, for the reaction test, a mass of sulphided catalyst of ~3 g is loaded in the reactor.

The reactor is heated from ambient temperature up to 1000° C. at 20°/min with a stream containing only nitrogen. After reaching this temperature value, the reactor is heated up to the reaction temperature (1050-1060° C.) in presence of a feed stream containing: $H_2S$: 65%, $O_2$: 17%, $NH_3$: 6%, and $N_2$ and traces of methane and $CO_2$. The contact time is varied between 0.5 and 2.2 seconds.

After the catalytic test, the reactor is cooled with a stream containing $H_2S$ (20 vol %) from the reaction temperature to 500° C. and subsequently to ambient temperature with a nitrogen stream.

The catalyst compositions tested, and the results obtained, are summarized in Table 1 below.

TABLE 1

Catalyst compositions; reaction conditions; results lab-scale testing

| # | Composition | Temp (° C.) | $H_2S$ Conversion (%) | $H_2$ Yield (%) | $SO_2$ Selectivity (%) | $SO_2$ conc. @ outlet (ppm) | $NH_3$ conc. @ outlet (ppm) |
|---|---|---|---|---|---|---|---|
| A | 17% NiS/5% $CeO_2/Al_2O_3$ | 1050 | 41 | 4 | 1.2 | 1700 | <50 |
| B | 17% NiS/10% $CeO_2/Al_2O_3$ | 1020 | 41 | 3 | 0.25 | 750 | <50 |
| C | 17% NiS/25% $CeO_2/Al_2O_3$ | 1050 | 37.5 | 1.7 | 0.05 | 120 | <50 |
| D | 9% NiS/15% $CeO_2/Al_2O_3$ | 1050 | 37.2 | 3.4 | 0 | 0 | <75 |
| E | 17% NiS/15% $CeO_2/Al_2O_3$ | 1070 | 44 | 7 | 0 | 0 | <50 |
| F | 25% NiS/15% $CeO_2/Al_2O_3$ | 1050 | 39 | 3 | 0 | 0 | <75 |

In some of these lab-scale experiments, powder comprising the catalyst is loaded into the reactor, and a ceramic blanket is placed after the catalyst bed. Even after prolonged time of operation at high temperatures, no change in the color of the ceramic blanket is observed. This indicates that the metal inside the catalyst composition has a low tendency to go into the gas phase at high temperature, as a change in the color of the ceramic blanket is commonly ascribed to the migration of the metal from the catalyst surface to the gas phase.

By contrast, in similar tests using another catalyst (comprising iron sulphide and molybdenum supported by a carrier comprising aluminum), it was observed that the ceramic blanket had changed color from white to black. In parallel, the catalyst powder had changed color from black to grey. These phenomena could be explained considering a poor stability of the active phases on the alumina support at high temperatures and under more stressful end of run conditions that caused a migration of the metal sulphides on the ceramic blanket.

In the case of the catalysts according to the invention, this phenomenon was not observed as stated above. In one aspect, this demonstrated a higher stabilization of the nickel sulphide by ceria-alumina promoted with respect to other catalysts. Hence, these experiments show the higher thermal stability of the catalyst according to the compositions of the invention.

The invention claimed is:

1. A method for the production of hydrogen from a $H_2S$-containing gas stream, comprising subjecting the gas stream to catalytic oxidative cracking so as to form $H_2$ and $S_2$, using a catalyst comprising at least one active metal selected from the group consisting of iron, cobalt, nickel, and combinations thereof, wherein said active metal is supported by a carrier comprising ceria and alumina.

2. The method of claim 1, wherein the composition of the catalyst comprises nickel.

3. The method of claim 1, wherein the $H_2S$-containing gas stream and an oxygen-containing gas-stream are combined to form a feedstock, wherein the catalytic oxidative cracking is conducted with a molar ratio $H_2S/O_2$ in the feedstock higher than 2:1.

4. The method of claim 3, wherein the ratio is in a range of from 3:1 to 5:1.

5. The method of claim 1, wherein the catalytic oxidative cracking is conducted using an oxygen-containing gas-stream comprising at least 40 vol. % oxygen.

6. The method of claim 5, wherein the oxygen-containing gas-stream is oxygen having a purity of from 90-100 vol. %.

7. The method of claim 1, wherein the catalytic oxidative cracking is conducted at a temperature in a range from 700° C. to 1300° C.

8. The method of claim 1, comprising a further step of subjecting formed $SO_2$ to hydrogenation.

9. The method of claim 1, further comprising quenching gas produced from the catalytic oxidative cracking to a temperature below 950° C. in a quench zone, wherein the residence time in the quench zone is from 10 ms to 300 ms.

10. The method of claim 1, wherein the $H_2S$-containing acid gas and an oxygen-containing gas are mixed in a static mixer before entering a first catalytic bed in a Catalytic Oxidative Cracking reaction zone or zones.

11. The method of claim 3, wherein the gas stream comprises $NH_3$ and the molar ratio of $NH_3/O_2$ in the feedstock is between 0.1 and 1.5.

12. The method of claim 10, wherein the Catalytic Oxidative Cracking reaction zone is followed by a Claus catalytic stage, comprising a gas reheater, Claus catalytic reactor and sulphur condenser.

13. The method of claim 3, wherein the catalytic oxidative cracking is conducted with a molar ratio $H_2S/O_2$ in the feedstock in the range of from 2:1 to 6:1.

14. The method of claim 4, wherein the ratio is in a range of from 3.5:1 to 4.5:1.

15. The method of claim 5, wherein the catalytic oxidative cracking is conducted using an oxygen-containing gas-stream comprising at least 60 vol. % oxygen.

16. The method of claim 7, wherein the catalytic oxidative cracking is conducted at a temperature in a range from 950° C. to 1250° C.

17. The method of claim 8, comprising a further step of subjecting formed COS and/or $CS_2$ to hydrogenation.

18. The method of claim 3, wherein the molar ratio is in the range of from 1:1 to 6:1.

* * * * *